United States Patent [19]

Sims et al.

[11] 4,414,459

[45] Nov. 8, 1983

[54] METHOD AND APPARATUS FOR OVERHEAD WELDING

[75] Inventors: James E. Sims, Houston, Tex.; Robert C. Schmick, Elmhurst, Ill.

[73] Assignee: Chicago Bridge & Iron Company, Oak Brook, Ill.

[21] Appl. No.: 317,139

[22] Filed: Nov. 2, 1981

[51] Int. Cl.³ ............................................... B23K 9/18
[52] U.S. Cl. ..................................... 219/73.2; 219/73
[58] Field of Search ................. 219/73 R, 73.2, 73.21, 219/160

[56] References Cited

U.S. PATENT DOCUMENTS 3,890,482 6/1978 DiBenedetto ..................... 219/73 R
4,153,832 5/1979 Iio et al. ............................ 219/73.2

Primary Examiner—B. A. Reynolds
Assistant Examiner—Catherine Sigda
Attorney, Agent, or Firm—Merriam, Marshall & Bicknell

[57] ABSTRACT

Apparatus for overhead welding a first metal plate to a second metal plate comprising a base; an electrically insulated support for granular flux, adapted to span and cover with flux an overhead joint to be welded, on the base; a welding wire guide for directing the wire to an overhead joint covered by the flux support; and a flux feeder at least partially supported by the base for forcing granular welding flux onto the flux support to cover the joint with flux.

A method of welding using the apparatus is also disclosed.

9 Claims, 2 Drawing Figures

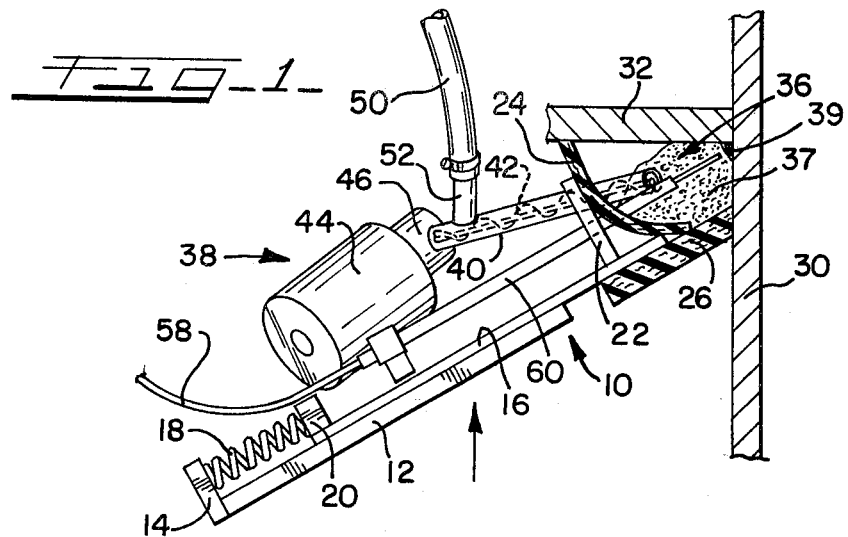
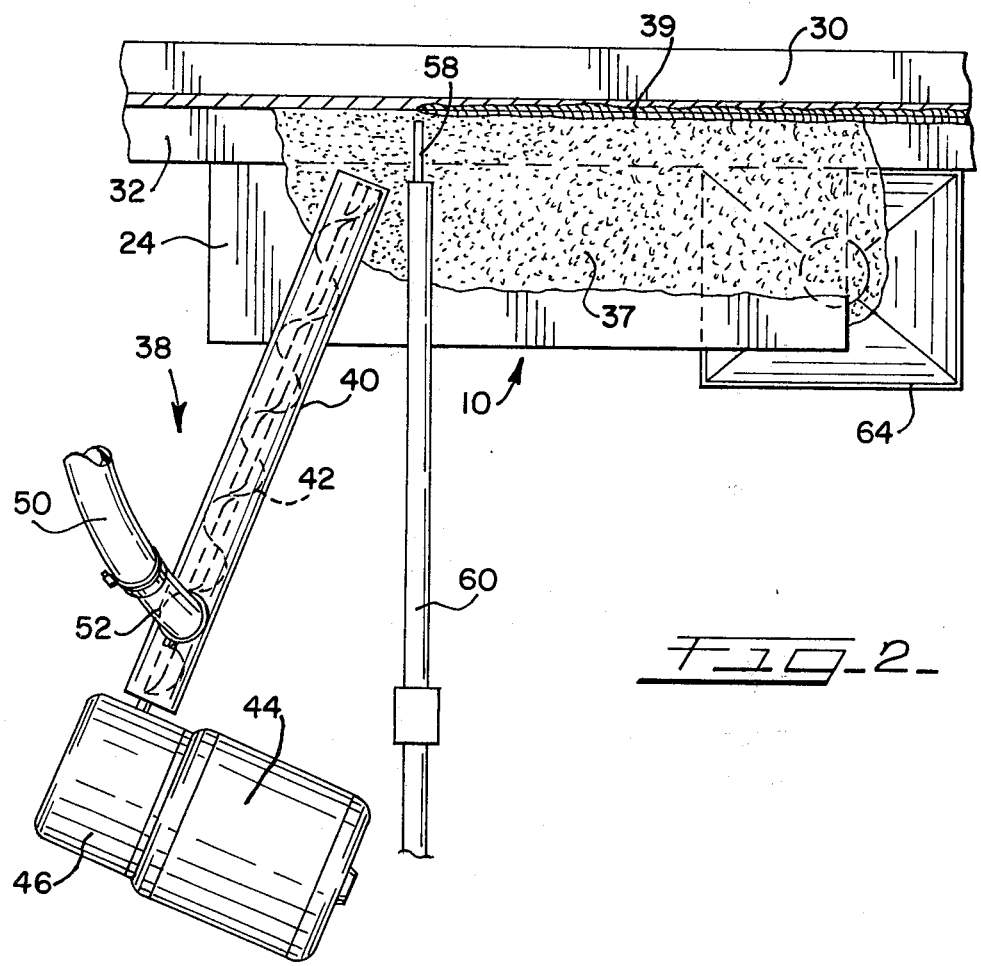

METHOD AND APPARATUS FOR OVERHEAD WELDING

This invention relates to apparatus and processes of welding overhead joints by submerged arc welding. More particularly, this invention is concerned with apparatus and methods for overhead submerged arc welding using a granular flux, and electrically insulated support means for the flux which spans the overhead joint.

BACKGROUND OF THE INVENTION

Many structures are fabricated of metal plate using joints or seams. Some such structures are petroleum storage tanks, nuclear reactor containment vessels, offshore drilling rigs and mooring towers, and water storage tanks. Some of these, and other, structures utilize welded joints deposited by submerged arc welding.

Submerged arc welding employs a mound of flux to cover the molten pool of metal formed in depositing the weld. As the weld progresses, a continuous band or stream of granular flux must be supplied to the joint to keep the weld submerged until the metal solidifies. The excess flux is then removed to complete the weld or to prepare it for deposition of the next weld pass.

Various types of equipment or apparatus has been developed for automatic girth seam, or joint, submerged arc welding of vertical plates, as see U.S. Pat. Nos. 2,638,524; 2,678,987; 2,698,891; 2,742,554; 2,761,954; 2,763,770; and 2,806,935. As shown by these patents, the granular flux is supplied to the joint by gravity and is supported by a horizontal plate or belt located beneath the joint.

In the fabrication of many structures of metal plate it is often necessary to make overhead welds on lapped joints or corner joints. These are made by hand in most instances. While overhead automatic welding has been done with the weld shielded from the atmosphere by an inert gas (i.e. argon), it is necessary to shield the weld area against air flow and wind. This is a substantial disadvantage. Furthermore, automatic submerged arc welding equipment for overhead welding is not available. A need accordingly exists for apparatus and methods for depositing submerged arc welds in overhead joints, especially automatically, so as to avoid as much as possible the use of hand welding.

SUMMARY OF THE INVENTION

According to one aspect of the invention, a method of overhead welding is provided which comprises positioning first and second metal plates with respect to each other so that they can be joined together by overhead welding of a joint; placing an electrically insulated support means for granular flux so as to span the joint with flux in a section of the joint to be welded; forcing granular welding flux onto the flux support means to cover the joint section with flux; and traversing the joint section with a welding arc submerged in the flux thereby depositing a weld which joins the plates together at the joint.

Both of the plates can be substantially horizontal or inclined, or one plate can be about horizontal and the other plate can be about vertical.

The flux support means can have two parallel edges of electrically insulating material and each one of such edges can be adapted to contact one of the plates.

According to a second aspect of the invention, apparatus is provided for overhead welding a first metal plate to a second metal plate comprising a base; an electrically insulated support means for granular flux, adapted to span and cover with flux an overhead joint to be welded, on the base; a welding wire guide for directing the wire to an overhead joint covered by the flux support means; and flux feeder means at least partially supported by the base for forcing granular welding flux onto the flux support means to cover the joint with flux.

The flux support means used in the apparatus can have two parallel edges of electrically insulating material and each one of such edges can be adapted to contact one of two plates forming a joint.

The flux feeder means can include a casing containing a powered auger for forcing the flux onto the support means so as to cover and submerge the joint to be welded.

BRIEF DESCRIPTION OF THE DRAWINGS

FIG. 1 is an elevational view of one embodiment of apparatus for supporting granular flux for overhead welding; and FIG. 2 is a partial plan view of the apparatus shown in FIG. 1.

DETAILED DESCRIPTION OF THE DRAWINGS

To the extent it is reasonable and practical, the same numbers will be used to identify the same elements or parts in the views of the drawings.

As shown in the drawings, base 10 is mounted on a suitable framework, not shown, which is adapted for movement along a joint to be welded. The base 10 comprises a bottom plate 12 with an upwardly projecting flange 14 on the rear edge. Slidable plate 16 is mounted on plate 12. One or more springs 18 are compressed between flange 14 and an upwardly extending flange 20 on the rear edge of plate 16.

Spaced inwardly from the forward edge of plate 16 is upwardly positioned plate 22. A strip 24 of flexible electrically insulating material is arcuately supported by plate 22 and the forward edge of plate 16. Insulating board 26 is connected to the front bottom surface of plate 16 so as to extend beyond the forward edge of plate 16 into contact with an upright or vertical metal plate 30. The upper edge of strip 24 is adapted to contact the bottom surface of an overhead metal plate, such as plate 32, to be overhead corner welded to plate 30. An elongated pocket 36 is thereby defined in which granular flux is supported during submerged arc welding.

Flux is supplied to pocket 36 by flux feeder 38 which has a tube 40 containing an auger or screw 42 which is driven by an electric motor 44 through a gear reduction box 46. Flux is fed from a hopper, not shown, to tube 50 which delivers it to nipple 52 in communication with the interior of tube 40. By means of the flux feeder, flux 37 is forced into pocket 36 and into the corner 39 formed by the junction of plates 30 and 32.

Welding wire 58 is fed through welding head 60 into the corner 39 where a submerged arc weld is deposited to join the plates together. The flux feeder 38, welding head 60 and the flux support are moved at the same rate to the left to deposit the desired weld. As a result of such movement, flux falls from the right or terminal end of the flux support and it is desirably captured in recovery hopper 64 for reuse.

Although not essential, the flux feeder 38 and the welding head 60 can be partially or wholly supported by slidable plate 16.

It should be understood that the flux feeder auger can be made sufficiently long so that it can be supplied with flux from a hopper by gravity flow. This will permit use of the apparatus when the horizontal plate extends outwardly for a substantial distance from the vertical plate to which it is to be joined by welding, thereby preventing the hopper from being above the horizontal plate.

The foregoing detailed description has been given for clearness of understanding only, and no unnecessary limitations should be understood therefrom, as modifications will be obvious to those skilled in the art.

What is claimed is:

1. A method of overhead welding which comprises:
   positioning first and second metal plates with respect to each other so that they can be joined together by overhead welding of a joint;
   placing an electrically insulated support means for granular flux so as to span the joint with flux in a section of the joint to be welded;
   forcing granular welding flux onto the flux support means to cover the joint section with flux; and
   traversing the joint section with a welding arc submerged in the flux on the flux support means thereby depositing a weld which joins the plates together at the joint.

2. A welding method according to claim 1 in which the first plate is horizontal and the second plate is vertical.

3. A welding method according to claim 1 in which the flux support means has two edges of electrically insulating material and each one of such edges is in contact with one of the plates.

4. Apparatus for overhead welding a first metal plate to a second metal plate comprising:
   a base;
   an electrically insulated support means for granular flux, adapted to span and cover with flux an overhead joint to be welded, on the base;
   a welding wire guide for directing the wire to an overhead joint covered by the flux support means; and
   flux feeder means at least partially supported by the base for forcing granular welding flux onto the flux support means to cover the joint with flux.

5. Apparatus according to claim 4 in which the flux support means has two edges of electrically insulating material and each one of such edges is adapted to contact one of two plates forming a joint.

6. Apparatus according to claim 5 in which one of the two plates is horizontal and the other plate is vertical.

7. Apparatus according to claim 4 in which the flux feeder means includes a casing containing a powered auger.

8. A method of overhead welding which comprises:
   positioning the first and second metal plates with respect to each other so that they can be joined together by overhead welding of a joint;
   placing an electrically insulated support means for granular flux so as to span the joint with flux in a section of the joint to be welded;
   said flux support means having two edges of electrically insulating material and each one of such edges contacts one but not the same plate;
   forcing granular welding flux onto the flux support means to cover the joint section with flux; and
   traversing the joint section with a welding arc submerged in flux on the flux support means while the flux support means moves along the joint section simultaneously thereby depositing a weld which joins the plates together at the joint.

9. Apparatus for overhead welding a first metal plate to a second metal plate comprising:
   a base;
   an electrically insulated support means for granular flux, adapted to span and cover with flux an overhead joint to be welded, on the base;
   said flux support means having two edges of electrically insulating material and each one of such edges is adapted to contact one of two plates, but not the same plate, forming a joint as the flux support means traverses the joint;
   a welding wire guide for directing a welding wire to an overhead joint covered and traversed by the flux support means to produce a submerged welding arc therein and a weld in the joint; and
   flux feeder means at least partially supported by the base for forcing granular welding flux onto the flux support means to cover the joint with flux as the flux support means traverses the joint.

* * * * *